United States Patent
Shaffer et al.

(10) Patent No.: US 9,091,358 B2
(45) Date of Patent: Jul. 28, 2015

(54) FLOW DIVERTER DEVICE

(71) Applicant: General Electric Company, Schenectady, NY (US)

(72) Inventors: Timothy Scott Shaffer, La Grange, KY (US); Mark Anthony Copelli, Floyds Knobs, IN (US); James Robert White, Crestwood, KY (US); Michael Lee Alsip, Louisville, KY (US)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 13/692,105

(22) Filed: Dec. 3, 2012

(65) Prior Publication Data

US 2014/0150906 A1     Jun. 5, 2014

(51) Int. Cl.
*F16K 11/083* (2006.01)
*F16K 11/085* (2006.01)
*E03B 7/07* (2006.01)

(52) U.S. Cl.
CPC ............. *F16K 11/0853* (2013.01); *E03B 7/074* (2013.01); *E03C 2201/40* (2013.01)

(58) Field of Classification Search
CPC ..... C02F 1/00; F16K 5/0407; F16K 11/0853; E03B 7/074; E03C 2201/40
USPC .................. 137/544, 625.16, 599.14, 599.15, 137/625.32, 625.46, 625.41, 625.47, 137/625.15, 625.19
See application file for complete search history.

(56) References Cited

U.S. PATENT DOCUMENTS

| | | | | |
|---|---|---|---|---|
| 3,233,865 | A * | 2/1966 | Panzica et al. | 251/309 |
| 4,036,249 | A * | 7/1977 | Perry et al. | 137/367 |
| 4,044,789 | A * | 8/1977 | Elmore | 137/367 |
| 4,318,424 | A * | 3/1982 | Bajka | 137/625.21 |
| 5,069,782 | A | 12/1991 | Moyher, Jr. et al. | |
| 5,279,329 | A * | 1/1994 | Pippel | 137/625.29 |
| 5,510,031 | A | 4/1996 | Knauf, Jr. et al. | |
| 5,581,826 | A * | 12/1996 | Edwards | 4/507 |
| 6,058,971 | A | 5/2000 | Palmer et al. | |
| 6,457,589 | B1 * | 10/2002 | Poirier et al. | 210/459 |
| 6,941,968 | B2 * | 9/2005 | Vidal | 137/544 |
| 8,839,818 | B2 * | 9/2014 | Ide et al. | 137/625.47 |
| 2005/0133463 | A1 | 6/2005 | Kirchner | |
| 2007/0199886 | A1 | 8/2007 | Korb et al. | |
| 2008/0110512 | A1 * | 5/2008 | Giagni et al. | 137/625.4 |
| 2009/0009041 | A1 | 1/2009 | Zeidler | |
| 2009/0090414 | A1 * | 4/2009 | Di Nunzio | 137/1 |
| 2009/0095353 | A1 * | 4/2009 | Arsin | 137/15.01 |
| 2009/0211654 | A1 * | 8/2009 | Nobili | 137/597 |
| 2010/0126613 | A1 * | 5/2010 | Campbell et al. | 137/625.46 |
| 2011/0030823 | A1 | 2/2011 | Seal et al. | |

* cited by examiner

*Primary Examiner* — Jessica Cahill
(74) *Attorney, Agent, or Firm* — Dority & Manning, P.A.

(57) ABSTRACT

A flow diverter device includes a valve body component defining therein two inlet channels and an outlet channel; and a rotatable diverter component comprising an exterior side wall and defining therein a connecting channel in the form of an annular slot positioned around a portion of the exterior side wall. The rotatable diverter component is rotatably received by the valve body component and being movable between a first position where the connecting channel fluidly connects one of the inlet channels with the outlet channel only and a second position where the connecting channel fluidly connects the other of the inlet channels with the outlet channel only.

16 Claims, 4 Drawing Sheets

US 9,091,358 B2

FLOW DIVERTER DEVICE

BACKGROUND

The subject matter disclosed herein relates generally to a flow diverter device, and more particularly to a flow diverter device that can be used in a water filtration system.

Various systems exist that aim to partition and/or direct incoming fluids to one or more particular outlets. By way of example, a water filtration system, which can include inlet/outlet tubing, a manifold and a filter component, receives untreated water, directs the water into a filter media, which subsequently directs the treated/filtered water back out for use.

In furtherance of this example, it is common for consumers to install a water filtration system under their sink and to have the system direct treated water to an auxiliary above-the-sink faucet. However, many consumers find having a second faucet undesirable, as it can be considered a detriment to the overall appearance of the sink and the kitchen. Accordingly, a need exists to produce a more convenient or desirable means of selecting between multiple fluid types (for example, treated or untreated water in the case of a water filtration system) and directing the selected fluid toward a common outlet or destination. Additionally, as power is not always available in various settings, it may be further desirable that the selection means not be electrically actuated, but rather mechanically based.

BRIEF DESCRIPTION OF EXAMPLE EMBODIMENTS OF THE INVENTION

As described herein, the exemplary embodiments of the present invention overcome one or more disadvantages known in the art.

An aspect of the present invention relates to a flow diverter device, which includes a valve body component defining therein two inlet channels and an outlet channel; and a rotatable diverter component comprising an exterior side wall and defining therein a connecting channel in the form of an annular slot positioned around a portion of the exterior side wall. The rotatable diverter component is rotatably received by the valve body component and being movable between a first position where the connecting channel fluidly connects one of the inlet channels with the outlet channel only and a second position where the connecting channel fluidly connects the other of the inlet channels with the outlet channel only.

Another aspect relates to a water filtration system, which includes a faucet, a water filter apparatus and a flow diverter device. The flow diverter device includes a valve body component defining therein a first inlet channel fluidly connected to a water supply through the water filter apparatus, a second inlet channel fluidly connected to the water supply directly, and an outlet channel fluidly connected to the faucet; and a rotatable diverter component defining therein a connecting channel, and operably coupled to the valve body component. The rotatable diverter component is movable between a first position where the connecting channel fluidly connects one of the first inlet channel and the second inlet channel with the outlet channel only and a second position where the connecting channel fluidly connects the other of the first inlet channel and the second inlet channel with the outlet channel only.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF EXAMPLE EMBODIMENTS OF THE INVENTION

As described herein, one or more embodiments of the invention include a flow diverter device. By way of example, a flow diverter device, as detailed in connection with one or more embodiments of the invention, can be incorporated into a system such as a water filtration system (for instance, installed in a domestic setting under a counter in conjunction with a faucet or faucets). By way of illustration, an example embodiment of the invention includes a flow diverter device provided for filtered and unfiltered water selection directed towards a faucet. Moreover, in such an example embodiment, the flow diverter device can be positioned under the sink and employed with a valve (for example, a three-port valve) having two inlets and one outlet that offers either filtered or unfiltered water to the sink faucet upon selection by the consumer with the aid of control knob on the counter top which is connected to the valve via a sealed stem.

Figure 1:
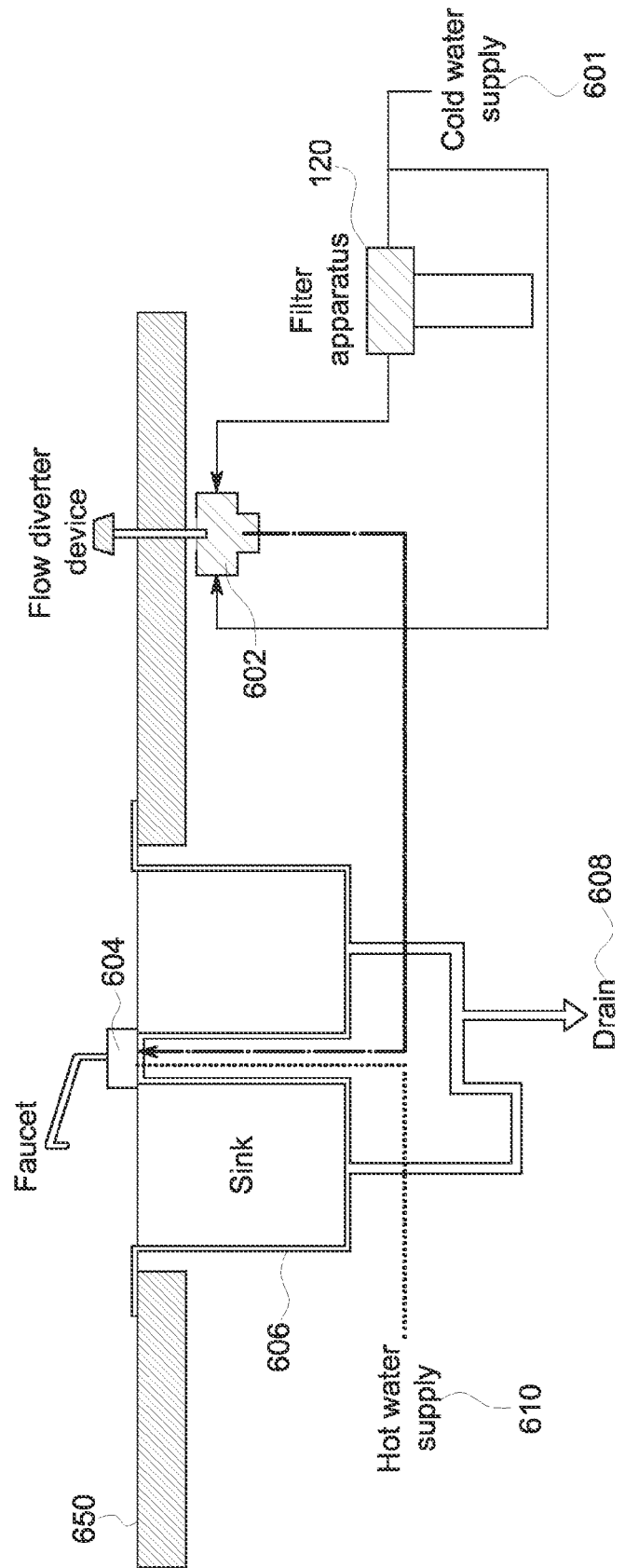
FIG. 1 illustrates a diverter feature in the context of a domestic water system, in accordance with a non-limiting example embodiment of the invention.

FIG. 1 illustrates an exemplary water filtration system, in accordance with a non-limiting example embodiment of the invention. By way of illustration, FIG. 1 depicts a cold water supply 601, which provides cold water to a water filter apparatus 120 as well as to a flow diverter device 602. Additionally, the water filter apparatus 120 provides filtered water to the flow diverter device 602. Flow diverter device 602 can provide a supply of cold and/or filtered water to faucet 604 within sink 606. Also, hot water supply 610 also provides a supply of water to faucet 604. Water (both hot and cold) can ultimately travel from sink 606 to drain 608. Additionally, as depicted in FIG. 1, an example system such as this one can be implemented in and underneath a surface 650 such as a counter-top.

Figure 2:
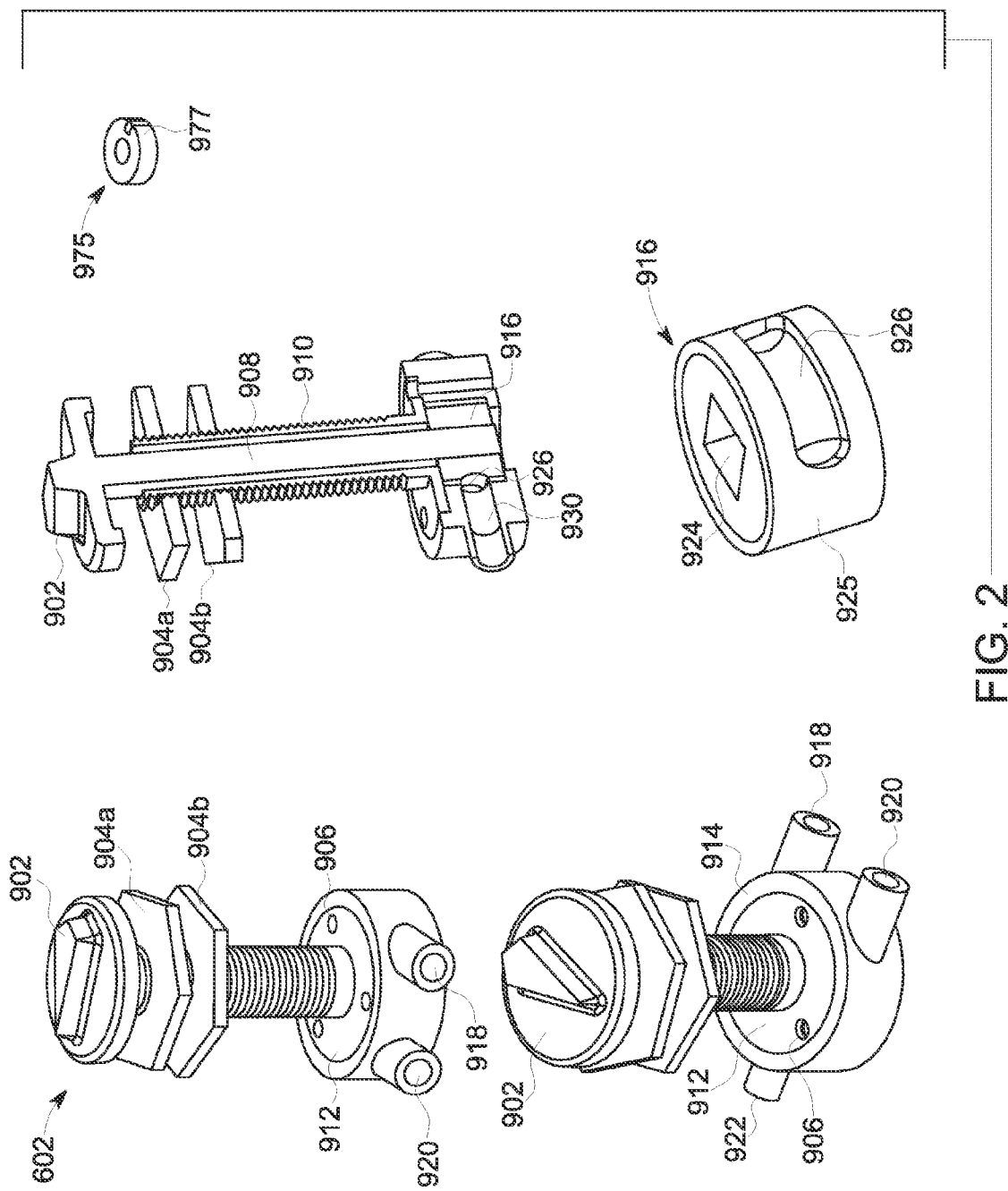
FIG. 2 illustrates a cross-section view and exterior views of a flow diverter device, in accordance with a non-limiting example embodiment of the invention.

FIG. 2 illustrates a cross-section view and exterior views of the flow diverter device 602, in accordance with a non-limiting example embodiment of the invention. By way of illustration, the flow diverter device 602 includes a consumer interface (for example, a knob) 902 (also referred to herein as a flow selector), a stem component or a diverter valve stem 908, a mounting component including retaining nuts 904a and 904b, and a penetration sleeve 910, which includes a fastening surface 912 with holes 906 for threaded fasteners (not depicted). Additionally, FIG. 2 depicts a filter status display monitor 975 with a light component 977 that, in one or more embodiments of the invention, can be retained between the topmost retaining nut 904a and the countertop 650 and/or retaining nut 904b.

The flow diverter device 602 also includes a (stationary) valve body component 914 which includes a first fluid inlet 918, a second fluid inlet 920 and an outlet 922. Further, the diverter device 602 includes a rotatable diverter component 916, which includes a drive feature recess 924 located on the top horizontal surface of the component and into which the stem component 908 is inserted to operably couple the knob 902 to the rotatable diverter component 916. In at least one embodiment of the invention, the rotatable diverter component 916 is coated on its side exterior wall 925 with a fluoropolymeric coating. The rotatable diverter component 916 has a connecting channel such as, for example, an annular slot 926 cut into the side exterior wall 925 and protruding into the wall (for example, by approximately ⅛ inch). In one example embodiment of the invention, the annular slot 926 is positioned around the side exterior wall 925 of the rotatable diverter component 916 for approximately 105 degrees (that is, the annular slot 926 horizontally covers approximately 105 degrees of the full circumference of the exterior wall 925 of the rotatable diverter component 916). Additionally, the rotatable diverter component 916 is fluidly connectable with the first fluid inlet 918, the second fluid inlet 920 and/or the outlet 922 of the valve body component 914 via the annular slot 926, as each of the inlets and outlet (918, 920 and 922) are connectable to a channel (such as diverter channel 930, for example) on the valve body component 914 which facilitates the passage of fluid from an inlet and/or outlet to and from the rotatable diverter component 916.

Figure 3:
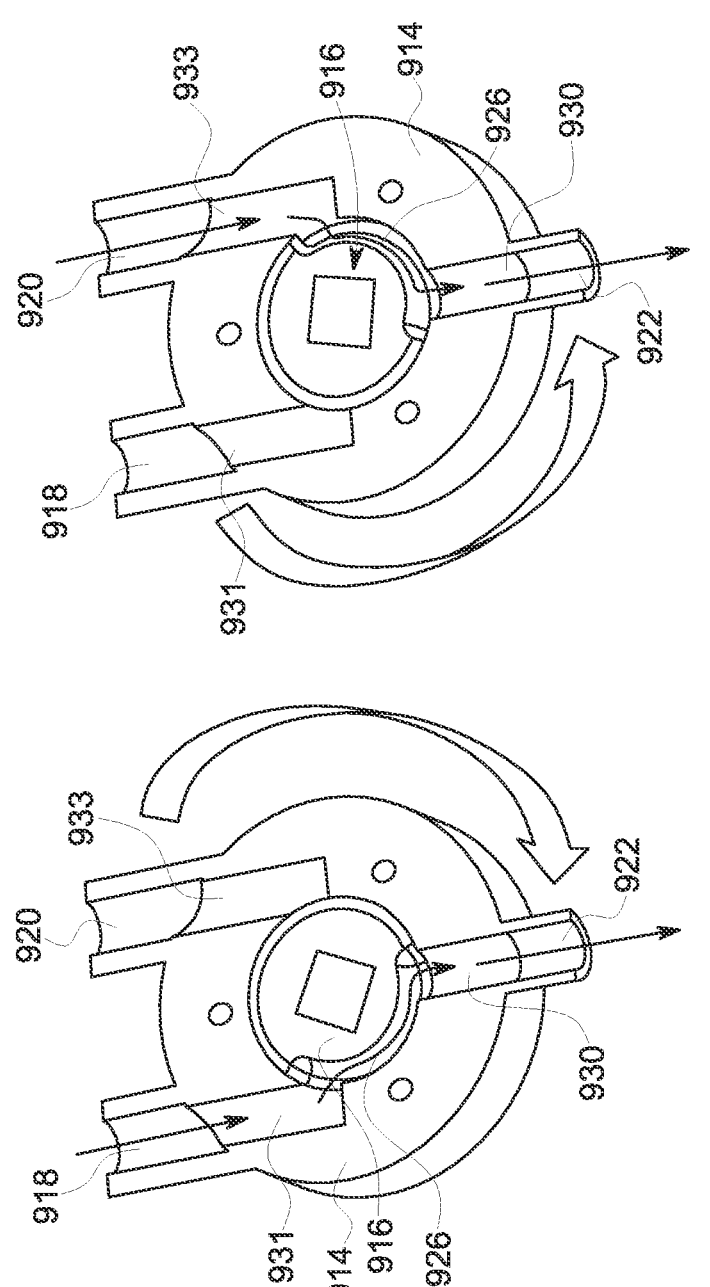
FIG. 3 illustrates overhead cross-section views of the rotatable diverter component, in accordance with a non-limiting example embodiment of the invention.

FIG. 3 illustrates overhead cross-section views of the rotatable diverter component 916, in accordance with a non-limiting example embodiment of the invention. Specifically, FIG. 3 depicts the implementation of the annular slot 926 of the rotatable diverter component 916 to fluidly couple the rotatable diverter component 916 with the first fluid inlet 918 with the outlet 922 of the valve body component 914, as well as the second fluid inlet 920 with the outlet 922 of the valve body component 914. Each of the inlets and outlet are coupled to a channel on the valve body component 914 which facilitates the passage of fluid from an inlet and/or outlet to and from the rotatable diverter component 916. Specifically, in the example embodiment illustrated in FIG. 3, the first fluid inlet 918 is coupled to channel 931 to form a first inlet channel, the second fluid inlet 920 is coupled to channel 933 to form a second inlet channel, and the outlet 922 is coupled to channel 930 to form an outlet channel. The rotatable diverter component 916 rotates so that the annular slot 926 is in a first position (as shown in the left image of FIG. 3) to connect the first fluid inlet 918 to the outlet 922, wherein the fluid can enter the first fluid inlet 918, travel through channel 931, into and through the annular slot 926 of the rotatable diverter component 916, which, in this first position, permits the flow to continue into channel 930 and ultimately out through the outlet 922.

Additionally, the rotatable diverter component 916 rotates so that the annular slot 926 is in a second position (as shown in the right image of FIG. 3) to connect the second fluid inlet 920 to the outlet 922, wherein the fluid can enter the second fluid inlet 920, travel through channel 933, into and through the annular slot 926 of the rotatable diverter component 916, which, in this second position, permits the flow to continue into channel 930 and ultimately out through the outlet 922.

As described herein (but not illustrated in FIG. 3), the knob 902 can limit the extent to which the rotatable diverter component 916 can be revolved, such that the knob, in at least one embodiment of the invention, can include a range-of-motion of approximately 90 degrees. Additionally, as detailed herein, the stem component 908 links the rotation of the knob 902 to the rotatable diverter component 916. For example, by turning the knob 902 to a first position, the stem component 908 rotates the rotatable diverter component 916 to a first position as described above, whereby the annular slot 926 fluidly couples with the first fluid inlet 918 an with the outlet 922 (while closing the flow path from the second fluid inlet 920 to the outlet 922). Further, by turning the knob 902 to a second position, the stem component 908 rotates the rotatable diverter component 916 to a second position as described above, whereby the annular slot 926 fluidly couples with the second fluid inlet 920 and with the outlet 922 (while closing the flow path from the first fluid inlet 918 to the outlet 922).

By way of example, a flow diverter device 602 such as described herein can be implemented in a system such that unfiltered and filtered water can be connected to inlets 918 and 920, respectively, of the valve body 914. As described further below, the knob 902, via a sealed stem connection, controls the flow of fluid from either the first fluid inlet 918 or second fluid inlet 920 by rotation (carried out, for example, manually by a user or consumer, or via automatic means). In such an embodiment, the outlet 922, depending on the position of the knob 902, will either supply filtered or unfiltered water to the sink faucet 604. Additionally, in at least one implementation of the invention, the knob 902 can be placed above the sink 606, while the plumbing connections and other diverter device components are underneath the counter 650.

Further, as would be appreciated by one skilled in the art, the first fluid inlet 918, the second fluid inlet 920 and the outlet 922 each can have a speed fit connector inserted to fasten and seal against inlet and outlet tubing leading to a fluid source and/or drainage.

As noted, the stem component 908 is inserted and fixed into drive feature recess 924 to operably couple the knob 902 to the rotatable diverter component 916. Additionally, in embodiments of the invention, the knob 902 and the stem component 908 can be constructed as portions of one component, or they can be separate and independent components coupled together.

Figure 4:
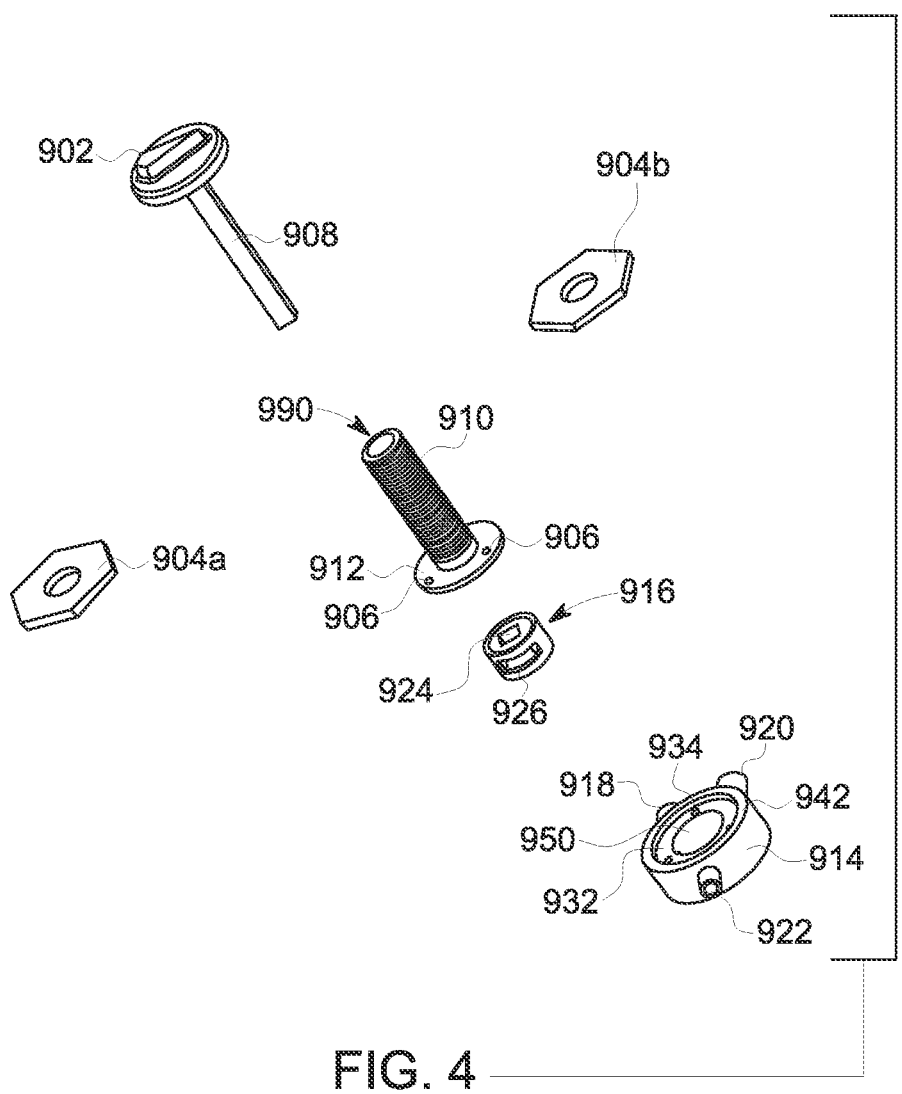
FIG. 4 illustrates an exploded view of various components of a diverter device, in accordance with a non-limiting example embodiment of the invention.

FIG. 4 illustrates an exploded view of various components of diverter device 602. By way of illustration, FIG. 4 depicts knob 902, which is fixed to stem component 908. FIG. 4 also depicts penetration sleeve 910, which includes fastening surface 912 with holes 906 for threaded fasteners (not depicted). As additionally illustrated in FIG. 4, retaining nuts 904a and 904b can be threaded onto the penetration sleeve 910, and the stem component 908 inserted into and through the penetration sleeve 910 (a hollow component) via penetration sleeve recess 990. Because countertops 650 and sinks 606, for example, can exist in various sizes, at least one embodiment of the invention includes retaining nuts such as 904a and 904b that are threaded so as to permit the installer to vertically adjust the position of the diverter device 602 such that the knob 902 does not protrude excessively above the sink 606 or countertop 650. Accordingly, the stem component 908 is a longer component than is the penetration sleeve 910, such that when the stem component 908 is inserted into the penetration sleeve 910, a portion of the stem component 908 extends beyond the base of the penetration sleeve 910 (and fastening surface 912) so that the stem component 908 can additionally be coupled to the rotatable diverter component 916. Further, as noted in connection with FIG. 2, the base of the penetration sleeve 910 includes an annular fastening surface 912 affixed thereto. The fastening surface 912 includes holes 906 designed for the insertion of threaded fasteners (not depicted)

to affix the penetration sleeve 910 to the valve body component 914, as described further below.

As additionally depicted in FIG. 3, the valve body component 914 includes first fluid inlet 918, second fluid inlet 920 and outlet 922, as described above in connection with FIG. 2. Also, the valve body component 914 includes an outer (larger diameter) annular horizontal surface 942 and inner (smaller diameter) annular horizontal surface 932. The inner annular horizontal surface 932 includes holes 934 for threaded fasteners (not depicted). Additionally, the valve body component 914 includes a recess 950 located within the inner annular horizontal surface 932. The recess 950 retains the rotatable diverter component 916. The rotatable diverter component 916 is not bounded to the valve body component 914. These two components (that is, 914 and 916) can be arranged in a conventional such as would be appreciated by one skilled in the art. Additionally, at least one embodiment of the invention can also optionally include a seal between the valve body component 914 and the rotatable diverter component 916, as well as between the rotatable diverter component 916 and the penetration sleeve 910.

After the rotatable diverter component 916 is inserted into the recess 950 of the valve body component 914, the penetration sleeve 910 can be positioned onto the valve body component 914. Specifically, the fastening surface 912 of the penetration sleeve 910 is positioned onto the inner annular horizontal surface 932 of the valve body component 914 such that the holes 906 on the fastening surface 912 are aligned with the holes 934 of the inner annular horizontal surface 932. Accordingly, threaded fasteners can be inserted through holes 906 and 934 to affix the penetration sleeve 910 to the valve body component 914.

Further, as noted above, upon insertion into the penetration sleeve 910 through the penetration sleeve recess 990, a portion of the stem component 908 extends beyond the base of the penetration sleeve 910 (and fastening surface 912) so that the stem component 908 can be couple to the rotatable diverter component 916, which has been displaced within the valve body component 914 as described above. Specifically, the stem component 908 is positioned and fixed into the drive feature recess 924 located on the top horizontal surface of the rotatable diverter component 916 to operably couple the knob 902 (which, as described above, is affixed to the stem component 908) to the rotatable diverter component 916.

Accordingly, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flow diverter device comprising:
   a valve body component defining therein two inlet channels and an outlet channel;
   a rotatable diverter component comprising an exterior side wall and defining therein a connecting channel in the form of an annular slot positioned around a portion of the exterior side wall, the rotatable diverter component being rotatably received by the valve body component and being movable between a first position where the connecting channel fluidly connects one of the inlet channels with the outlet channel only and a second position where the connecting channel fluidly connects the other of the inlet channels with the outlet channel only;
   a penetration sleeve connected to the valve body component and defining therein a penetration sleeve recess;
   a diverter valve stem passing through the penetration sleeve recess and being connected to the rotatable diverter component; and
   a mounting component for mounting the flow diverter device to an object, the mounting component being movably supported by the penetration sleeve component so that a distance between the mounting component and the valve body component is adjustable,
   wherein the two inlet channels and the outlet channel each extend outward from the exterior side wall of the rotatable diverter component.

2. The flow diverter device of claim 1, wherein the annular slot is positioned around a portion of the exterior side wall that covers approximately 105 degrees of the exterior side wall of the rotatable diverter component.

3. The flow diverter device of claim 1, wherein the two inlet channels and the outlet channel each extend outward from the exterior side wall of the rotatable diverter component in a same plane.

4. The flow diverter device of claim 1, wherein the mounting component comprises two retaining nuts rotatably supported by the penetration sleeve.

5. The flow diverter device of claim 4, wherein the two retaining nuts are rotatably threaded onto the penetration sleeve.

6. The flow diverter device of claim 1, further comprising a flow selector connected to the diverter valve stem, wherein rotation of the flow selector moves the rotatable diverter component between the first position and the second position.

7. The flow diverter device of claim 6, wherein the flow selector comprises a knob.

8. The flow diverter device of claim 6, wherein the flow selector is disposed above the mounting component.

9. A water filtration system comprising:
   a faucet;
   a water filter apparatus; and
   a flow diverter device comprising:
      a valve body component defining therein a first inlet channel fluidly connected to a water supply through the water filter apparatus, a second inlet channel fluidly connected to the water supply directly, and an outlet channel fluidly connected to the faucet;
      a rotatable diverter component comprising an exterior side wall and defining therein a connecting channel in the form of an annular slot positioned around a portion of the exterior side wall, and operably coupled to the valve body component, the rotatable diverter component being movable between a first position where the connecting channel fluidly connects one of the first inlet channel and the second inlet channel with the outlet channel only and a second position where the connecting channel fluidly connects the other of the first inlet channel and the second inlet channel with the outlet channel only;

a penetration sleeve connected to the valve body component and defining therein a penetration sleeve recess;

a diverter valve stem passing through the penetration sleeve recess and being connected to the rotatable diverter component; and a mounting component for mounting the flow diverter device to a countertop, the mounting component being movably supported by the penetration sleeve component so that a distance between the mounting component and the valve body component is adjustable, wherein the first inlet channel, the second inlet channel and the outlet channel each extend outward from the exterior side wall of the rotatable diverter component.

10. The water filtration system of claim 9, wherein the first inlet channel, the second inlet channel and the outlet channel each extend outward from the exterior side wall of the rotatable diverter component in a same plane.

11. The water filtration system of claim 9, wherein the rotatable diverter component is rotatably received by the valve body component.

12. The water filtration system of claim 11, wherein the annular slot is positioned around a portion of the exterior side wall that covers approximately 105 degrees of the exterior side wall of the rotatable diverter component.

13. The water filtration system of claim 9, further comprising a flow selector connected to the diverter valve stem, wherein rotation of the flow selector moves the rotatable diverter component between the first position and the second position.

14. The water filtration system of claim 13, wherein the flow selector comprises a knob.

15. The water filtration system of claim 9, wherein the mounting component comprises two retaining nuts rotatably supported by the penetration sleeve.

16. The water filtration system of claim 15, wherein the two retaining nuts are rotatably threaded onto the penetration sleeve.

\* \* \* \* \*